United States Patent
Lehr et al.

(10) Patent No.: US 8,578,125 B2
(45) Date of Patent: Nov. 5, 2013

(54) ALLOCATION OF STORAGE SPACE FOR CRITICAL DATA SETS

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/903,777

(22) Filed: Oct. 13, 2010

(65) Prior Publication Data

US 2012/0096235 A1 Apr. 19, 2012

(51) Int. Cl.
G06F 12/02 (2006.01)

(52) U.S. Cl.
USPC .......................................... 711/171; 711/173

(58) Field of Classification Search
None
See application file for complete search history.

(56) References Cited

U.S. PATENT DOCUMENTS

| | | | |
|---|---|---|---|
| 5,966,732 A | 10/1999 | Assaf | |
| 7,636,744 B1 | 12/2009 | Aggarwal et al. | |
| 7,669,029 B1 * | 2/2010 | Mishra et al. | 711/170 |
| 8,001,356 B2 * | 8/2011 | Im et al. | 711/173 |
| 2004/0078542 A1 * | 4/2004 | Fuller et al. | 711/172 |
| 2008/0140962 A1 | 6/2008 | Pattabiraman et al. | |
| 2009/0043831 A1 | 2/2009 | Antonopoulos et al. | |

* cited by examiner

Primary Examiner — Gary Portka
(74) Attorney, Agent, or Firm — David W. Victor; Konrad Raynes Davda & Victor (57) ABSTRACT

Described are embodiments of an invention for allocating storage space in a storage system for critical data sets. The computing environment includes at least one server including a processor and memory. The server is coupled to storage. The memory further includes a storage manager including an allocation module and an alert module. The storage manager defines a common area for storing non-critical data sets and critical data sets in the storage group. The storage manager also defines a critical reserve area for storing only critical data sets in the first storage group. A predefined percentage of available storage space is reserved for the critical reserve area. The predefined percentage of available space is determined by comparing the available storage space within the critical reserve area to the storage space in the storage group. Upon allocating additional storage to the storage group, the allocation module allocates an amount of the additional storage space to the critical reserve area such that the predefined percentage of available storage space is maintained in the critical reserve area.

18 Claims, 3 Drawing Sheets

ALLOCATION OF STORAGE SPACE FOR CRITICAL DATA SETS

TECHNICAL FIELD

This invention relates in general to computers, and more particularly to a method, system, and computer program product for allocating storage space for critical data sets in a storage group of a system-managed storage environment.

BACKGROUND

System-managed storage (SMS) refers to applications or programs that enable an operating system to take over many of the tasks of managing storage, including tasks that were previously performed manually by storage administrators. When configuring an SMS application, a storage administrator may define classes of storage and rules designating how data sets are allocated to these classes of storage. Once the SMS application is properly configured, the SMS application may automatically perform tasks such as allocating data sets to appropriate storage volumes or storage groups, backing up the data sets, managing space in the storage volumes or storage groups, and migrating older data sets to less expensive forms of storage.

SMS applications are important to keep storage costs down and ensure that storage is used efficiently. The costs of storage may include not only the initial cost to purchase the storage, but also costs of electricity to operate the storage, facilities to house the store, and personnel to install, monitor, and/or manage the storage. Although removable media such as optical and tape storage may cost less per megabyte than other types of storage, this type of media may require additional time and resources to locate, retrieve, and mount. Considering all the costs, SMS applications play an important role in controlling and managing storage so a business can grow and expand in a profitable manner.

While system managed storage takes away much of the users' responsibility for volume level space management, there are some situations in which a user error or improper monitoring of the system may result in insufficient storage space to complete an input/output (I/O) request. For example, a user may request a large number of recall jobs, exhausting the storage space within a storage group. A user error such as this can lead to a storage system outage, thus preventing critical data sets from being able to extend. The inability to extend critical data sets may have high monetary impacts on the user's business. For example, if the critical data sets include stock market records, every second the storage system is offline may equate to a loss of thousands of dollars. Accordingly, it is important to provide safeguards from a user error that may prevent critical data sets from extending in a storage group.

SUMMARY OF THE INVENTION

Described are embodiments of an invention for allocating storage space in a storage system for critical data sets. The computing environment includes at least one server including a processor and memory. The server is coupled to storage. The memory further includes a storage manager including an allocation module and an alert module. Storage includes at least at least one storage group. The storage manager defines a common area for storing non-critical data sets and critical data sets in the storage group. The storage manager also defines a critical reserve area for storing only critical data sets in the first storage group. A predefined percentage of available storage space is reserved for the critical reserve area. The predefined percentage of available space is determined by comparing the available storage space within the critical reserve area to the storage space in the storage group. An existing data set can only be extended, or a new data set allocated, in the critical reserve area when the data set is a critical data set and there is insufficient space storage space in the common area for the data set. Upon allocating additional storage to the storage group, the allocation module allocates an amount of the additional storage space to the critical reserve area such that the predefined percentage of available storage space is maintained in the critical reserve area. Thus, when a user request exhausts the storage space within the common area of a storage group, the critical reserve area has reserved storage space available to store critical data sets, preventing costly system down time.

For example, an embodiment of a computer implemented method for allocating storage space in a storage group within a system managed storage environment, the storage group having a common area and a critical reserve area includes reserving a predefined percentage of available storage space within the critical reserve area. The method also determines the storage group requires additional storage space. Further, the method includes allocating additional storage space to the storage group such that the predefined percentage of available space is determined by comparing available storage space within said critical reserve area to said storage space in said storage group.

The common area is for storing non-critical data sets and critical data sets, and said critical reserve area is for storing critical data sets only when the common area has insufficient space.

The method of allocating additional storage space to the storage group includes first allocating a determined amount of said additional storage space to the critical reserve area such that the predefined percentage of available storage space is maintained in the critical reserve area, and subsequently, allocating a remaining amount of the additional storage space to the common area.

Further, the method includes extending an existing data set, or allocating a new data set, in the critical reserve area when it is determined that there is insufficient storage space in the common area for the data set and when the data set is a critical data set. The step of determining the storage group requires additional storage space includes determining that an existing data set has extended, or a new data set has been allocated, in said critical reserve area. In addition, the method includes providing an alert in response to extending an existing data set or allocating a new data set in the critical reserve area.

The critical data sets may be defined by assigning data sets to a data class with a critical attribute selected. Further, the predefined percentage may be defined by a user.

In an embodiment of computer-readable media having executable instructions stored thereon for causing components of a computing environment to perform a method, the computing environment has at least one server coupled to a storage group. The storage group includes a common area and a critical reserve area. The method includes reserving a predefined percentage of available storage space within the critical reserve area. The method also determines the storage group requires additional storage space. Further, the method includes allocating additional storage space to the storage group such that the predefined percentage of available space is maintained in the critical reserve area. The predetermined percentage of available space is determined by comparing available storage space within said critical reserve area to said storage space in said storage group.

Finally, in an embodiment of a computing environment, the environment includes a server coupled to a storage group. The storage group includes a common area and a critical reserve area. The server includes a processor coupled to memory. The memory includes computer-readable instructions implemented by the processor to reserve a predefined percentage of available storage space within said critical reserve area. Further, the memory includes computer-readable instructions implemented by the processor to determine the storage group requires additional storage space and to allocate additional storage space to the storage group such that the predefined percentage of available space is maintained in the critical reserve area. The predefined percentage of available space is determined by comparing the available storage space within the critical reserve area to the storage space in the storage group.

For a fuller understanding of the present invention, reference should be made to the following detailed description taken in conjunction with the accompanying drawings.

DETAILED DESCRIPTION OF THE PREFERRED EMBODIMENT

Described are embodiments of an invention for allocating storage space in a storage system for critical data sets. The computing environment includes at least one server including a processor and memory. The server is coupled to storage. The memory further includes a storage manager including an allocation module and an alert module. Storage includes at least at least one storage group. The storage manager defines a common area for storing non-critical data sets and critical data sets in the storage group. The storage manager also defines a critical reserve area for storing only critical data sets in the first storage group. A predefined percentage of available storage space is reserved for the critical reserve area. The predefined percentage of available space is determined by comparing the available storage space within the critical reserve area to the storage space in the storage group. An existing data set can only be extended, or a new data set allocated, in the critical reserve area when the data set is a critical data set and there is insufficient space storage space in the common area for the data set. Upon allocating additional storage to the storage group, the allocation module allocates an amount of the additional storage space to the critical reserve area such that the predefined percentage of available storage space is maintained in the critical reserve area. Thus, when a user request exhausts the storage space within the common area of a storage group, the critical reserve area has reserved storage space available to store critical data sets, preventing costly system down time.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings and without deviating from the spirit or scope of the invention.

Figure 1:
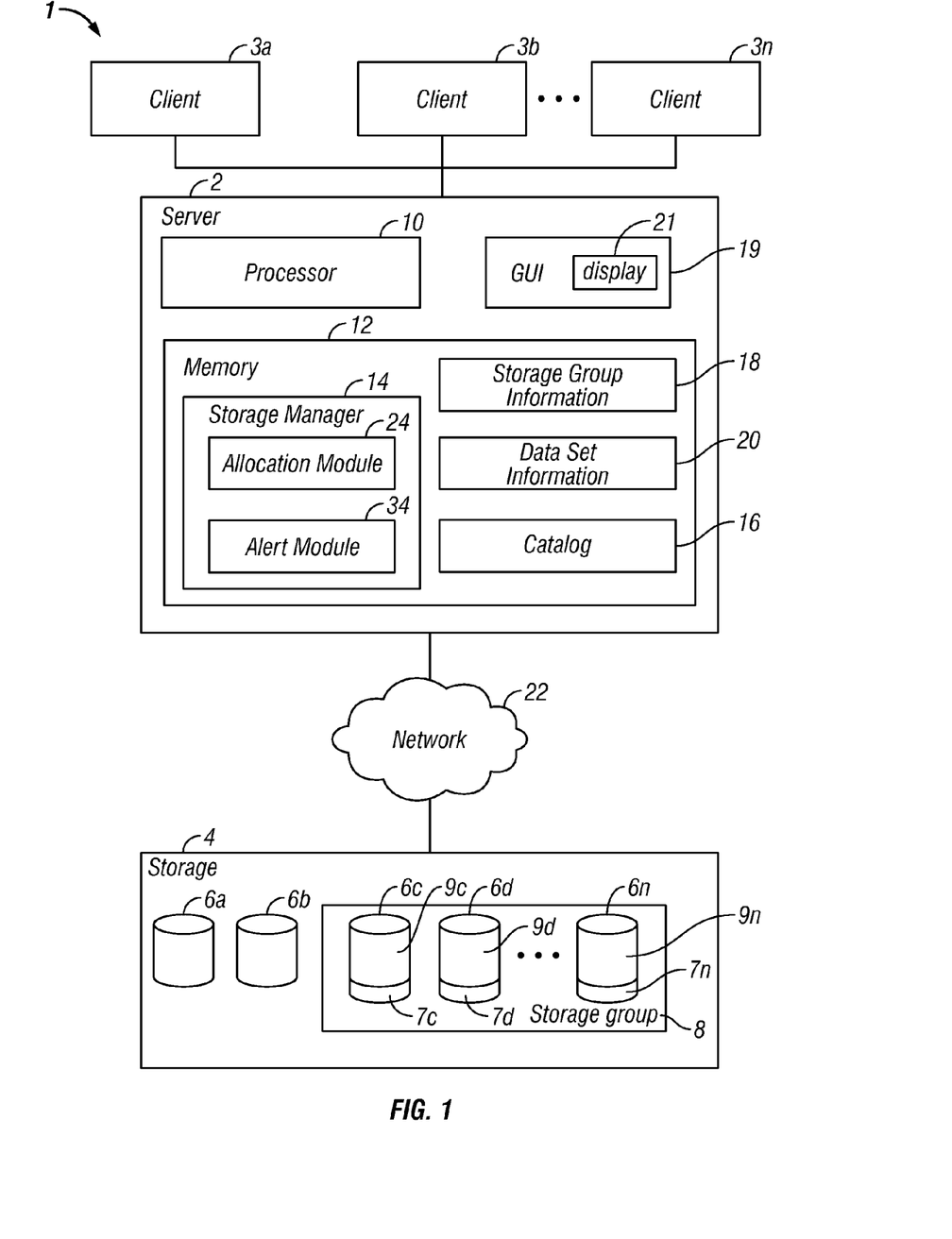
FIG. 1 is a block diagram illustration of a computing environment in accordance with an embodiment of the invention.

FIG. 1 illustrates a computing environment 1 in accordance with certain implementations of the invention. One or more clients 3a, 3b, ... 3n are connected to server 2. The character suffixes of "a" and "n" and the ellipses (e.g. 3a, 3b, ... 3n) indicate herein that any number of referenced elements (e.g., clients) may be included in the computing environment 1. Clients 3a, 3b, ... 3n may comprise any type of computing device. Clients 3a, 3b, ... 3n store data and access data managed by server 2.

Server 2 provides Input/Output ("I/O") access to storage 4 having a plurality of storage devices 6a, 6b, 6c, 6d, ... 6n each having storage volumes (not shown). In one embodiment, server 2 may communicate with the storage devices 6a, 6b, 6c, 6d, ... 6n over a network 22, such as a local area network (LAN), storage area network (SAN), wireless network, peer-to-peer network, the Internet, and Intranet, direct connections, bus interface, etc.

The server 2 includes a processor 10, memory 12, and GUI 19. The memory 12 includes a storage manager 14 that manages migration and recall of data sets in the volumes and selects the resources of storage 4 to store the data sets. Storage 4 may have one or more storage groups 8. Storage groups 8 represent the physical storage (e.g. collections of hard disk drives including volumes) managed by the storage manager 14.

The memory 12 stores data structures used by the storage manager 14, including a catalog 16 providing information on data sets migrated from one volume to another. The memory 12 also includes storage group information 18 having information on storage attributes of the storage devices 6a, 6b, 6c, 6d, ... 6n and the volumes, such as performance, I/O throughput, Redundant Array of Independent Disk (RAID) configuration, striping configuration, redundancy, etc. Further, the memory 12 has data set information 20 on the data sets in the volumes, including attributes and classes assigned to the data sets, such as a data class, storage class and management class. Thus, the data set information 20 can be used by storage manager 14 to select a storage group 8 having storage attributes that satisfy the requirements of the data set.

In one embodiment, the data set information 20 includes information about whether or not the data set is critical. Data sets are defined as critical by assigning the data set to a data class with a critical attribute selected. In one embodiment, a user may define a data set as critical by assigning the data set to a data class with a critical attribute selected. A user may choose to define a data set as critical when the data in the data set is regarded as more important than other data in other data sets. For example, a data set that contains stock market trading information may be more important than a data set containing backup email files. Accordingly, the user may select the critical attribute for the data set containing the stock market trading information. The selection of the critical attribute is discussed further below.

The storage manager 14 includes an allocation module 24 which allocates additional storage space to storage group 8. Specifically, in one embodiment, the allocation module 24 reserves a predefined percentage of available storage space within the critical reserve area 7c, 7d, ... 7n. The predefined percentage of available space is a set percentage of overall storage space of the storage group 8 which is reserved and maintained in the critical reserve area 7c, 7d, ... 7n, and available for storing, extending, or allocating, critical data sets. In one embodiment, a user may define the predefined percentage of available storage space. In other embodiments, the predefined percentage of available storage space may be defined by an Information Technology (IT) administrator, or other administrator, or alternatively, it may be preconfigured by the manufacturer.

The remaining storage space of the storage group 8, other than the critical reserve area 7c, 7d, . . . 7n is defined as the common area 9c, 9d, . . . 9n. The common area 9c, 9d, . . . 9n may be utilized to store data sets of the storage group 8 that do not have a critical attribute selected (i.e. non-critical data sets) as well as data sets that do have the critical attribute selected (i.e. critical data sets). On the other hand, the critical reserve area 7c, 7d, . . . 7n may only be utilized for storing critical data sets in the storage group 8. Further, in one embodiment, the storage manager 14 stores data sets in the critical reserve area 7c, 7d, . . . 7n only when the common area 9c, 9d, . . . 9n has insufficient storage space to store the critical data set.

It should be understood by one of ordinary skill in the art that while only one storage group 8 is shown, storage 4 may include any number of storage groups 8. Further, it should be understood that while the critical reserve area 7c, 7d, . . . 7n is shown to be in all of the storage devices 6c, 6d, . . . 6n of the storage group 8, the critical reserve area 7c, 7d, . . . 7n may be reserved in a single storage device (e.g. 6c) or in one or more storage devices 6c, 6d, . . . 6n of the storage group 8.

The storage manager 14 further includes an alert module 34 which alerts the user when the storage manager 14 extends an existing data set in the critical reserve area 7c, 7d, . . . 7n or when a new data set is allocated in the critical reserve area 7c, 7d, . . . 7n. The alert may be presented to the user via the display 21 of GUI 19.

In one embodiment, in response to extending an existing data set or allocating a new data set in the critical reserve area 7c, 7d, . . . 7n, the allocation module 24 of the storage manager 14 allocates additional storage space to the storage group. Whether in response to extending an existing data set, or allocating a new data set in the critical reserve area 7c, 7d, . . . 7n, or for any other allocation process, the allocation module 24 allocates an amount of the additional storage space to the storage group 8 such that the predefined percentage of available storage space is maintained in the critical reserve area 7c, 7d, . . . 7n.

As discussed above, the predefined percentage of available space is a set percentage of overall storage space of the storage group 8 which is reserved and maintained in the critical reserve area 7c, 7d, . . . 7n, and available for storing, extending, or allocating, critical data sets. Therefore, if a portion of the storage space in critical reserve area 7c, 7d, . . . 7n is utilized when a data set is extended or allocated in the critical reserve area 7c, 7d, . . . 7n, then that storage space is no longer available storage space. Accordingly, when the allocation module 24 allocates an amount of the additional storage space to the storage group 8 it allocates an amount of storage space to the critical reserve area 7c, 7d, . . . 7n not only to adjust for the increased overall storage space of the storage group 8, but also to replenish the storage space utilized by extending or allocating a data set, such that said predefined percentage of available storage space is maintained.

Further, the step of allocating the additional storage space to the storage group includes first allocating a determined amount of the additional storage space to the critical reserve area 7c, 7d, . . . 7n such that the predefined percentage of storage space is maintained in the critical reserve area 7c, 7d, . . . 7n, and subsequently, allocating the remaining amount of the additional storage space to the common area 9c, 9d, . . . 9n. Thus, when a user request exhausts the storage space within the common area 9c, 9d, . . . 9n of storage group 8, the critical reserve area 7c, 7d, . . . 7n has reserved storage space available to store critical data sets, preventing costly system down time.

In one embodiment, the additional storage space allocated to the storage group 8 is one storage volume. However, it should be understood by one of ordinary skill in the art that the invention is not limited to a particular amount of additional storage space allocated to the storage group 8. For example, in other embodiments, the additional storage space allocated may be more than one storage volume, and, in other embodiments, the additional storage space may be less then one storage volume.

As discussed above, server 2 may also include a GUI 19 with a display 21 that provides an indication to a user about the storage management of storage 4. For example GUI display 21 may present the user with alerts that indicate an error, such as an error in extending or allocating storage space to a storage group 8. Other alerts may include an indication that a portion of critical reserve area 7c, 7d, . . . 7n was utilized during a data I/O. GUI display 21 may also present the amount of storage space that is available to the user. Further, the GUI display 21 may present query displays to the user. The query display may request the user to indicate the number of storage groups 8 needed by the user. The query display may also request the user to indicate how much storage space should be assigned to each storage group 8 of the plurality of storage groups 8. Further, the query display may request the user to indicate whether a data set is a critical data set. Still further, the query display may request the user to indicate the predefined percentage of available storage space that should be reserved for the critical reserve area 7c, 7d, . . . 7n. In addition, the GUI display 21 may also indicate for each storage group 8 the storage devices 6a, 6b, 6c, 6d, . . . 6n assigned to the storage group 8, wherein the space available in the storage group 8 and the space used in the storage group 8 may also be indicated. In one embodiment, the GUI display 21 may query the user upon set up of a storage group 8. It should be understood, however, that the user may input information to the GUI 19 at any time after the initial configuration of the computing environment 1 of FIG. 1. For example, a user may select the critical attribute for a data set that was previously not indicated as a critical. Further, the predefined percentage of available storage space reserved for the critical reserve area 7c, 7d, . . . 7n may be changed at any time after the initial setup of the computing environment 1.

The server 2 may be any storage server, such as enterprise storage server, a workstation, etc. Each storage device 6a, 6b, 6c, 6d, . . . 6n may comprise a solid state storage device comprised of solid state electronics, such as a EEPROM (Electrically Erasable Programmable Read-Only Memory), flash memory, flash disk, storage-class memory (SCM), etc., magnetic storage disk, an array of disks, optical disk, tape, etc. The storage devices 6a, 6b, 6c, 6d, . . . 6n may be implemented in a distributed storage environment or network storage environment, such as "cloud" storage. Alternatively, the storage devices 6a, 6b, 6c, 6d, . . . 6n may be implemented at a single location. The memory 12 may comprise one or more volatile or non-volatile memory devices.

The storage manager 14 may be implemented as code in a computer readable storage medium executed by a processor 10 as shown in FIG. 1. Alternatively, the storage manager 14 may be implemented with hardware logic, such as an Application Specific Integrated Circuit (ASIC). The storage manager 14 may be part of an operating system for the server 2 or comprise a separate storage facility of the operating system, such as the Data Facility Storage Management Subsystem (DFSMS) provided by International Business Machines Corporation ("IBM"). DFSMS provides an operating environment to automate and centralize the management of storage, data management program, management device management.

It should be appreciated that the computing system(s) can be any device capable of processing data, such as, a server, mainframe, personal computer, laptop, or mobile device, which includes smartphones and the like. It should be understood by one of ordinary skill in the art that the computing systems can include additional components such as at least one processor, memory, a network adapter, and antenna that are managed by an operating system.

Further, the computing device may include a user interface, such as a keyboard, touchscreen, or pointing device that enables user input. Finally, the computing device may include a user viewable screen displaying a graphical user interface (GUI) or text-based interface, such as a Command Line Interface (CLI).

Many general or special purpose operating systems exist that manage the components of the computing system, such as Lunix, or other Unix-type operating systems and Microsoft Windows-style operating systems. The operating systems can organize data using "file systems," which are data repositories for files.

Figure 2:
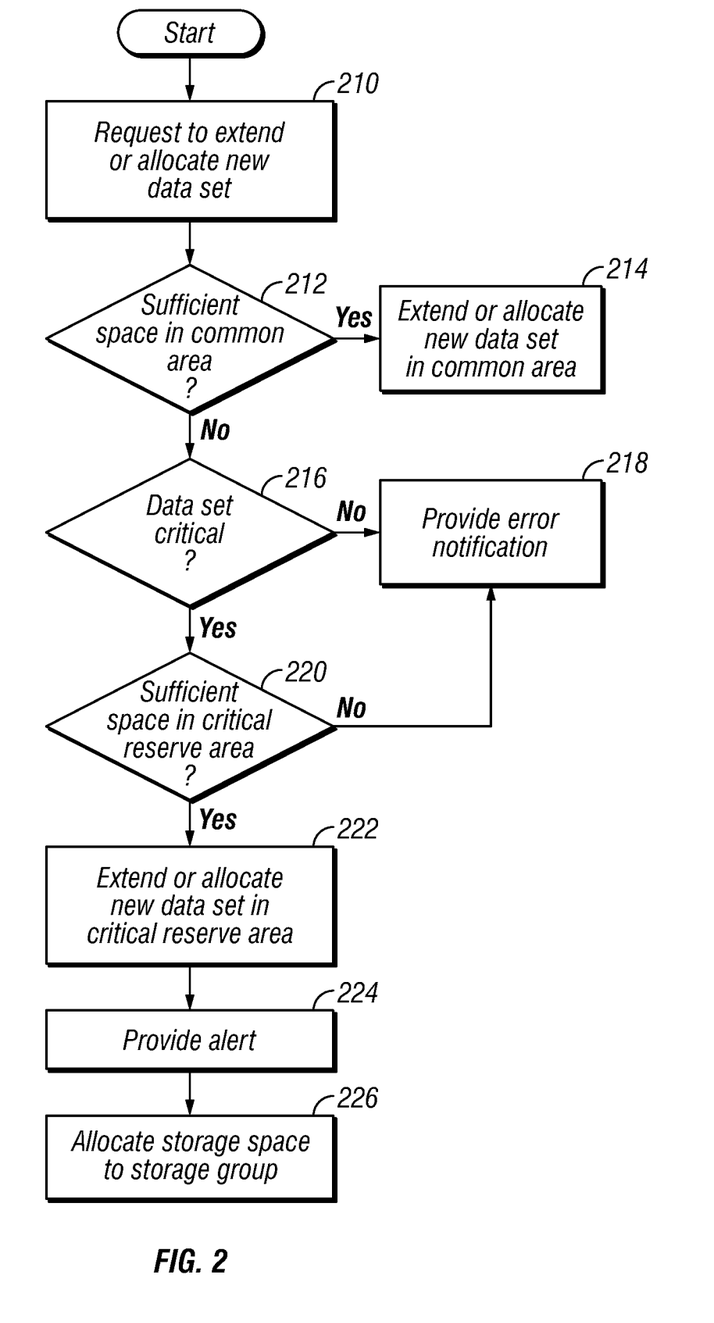
FIG. 2 is flowchart of operations for managing storage in accordance with an embodiment of the invention.

FIG. 2 is a flow chart of operations for managing storage in accordance with one embodiment of the invention. In step 210, the storage manager 14 receives a request to extend an existing data set or allocate a new data set. In one embodiment, the request to extend the existing data set or allocate a new data set may result from an application running in one of the clients 3a, 3b, . . . 3n issuing a request to write to a data set. If the there is insufficient space to perform the write request in the data set, then the storage manager 14 receives a request to extend the existing data set or allocate a new data set.

In step 212 the storage manager 14 determines if storage space in the common area 9c, 9d, . . . 9n of the storage pool 8 is sufficient to entirely satisfy the storage space requirements of the extend or allocation request of step 210. If there is sufficient space in the common area 9c, 9d, . . . 9n of storage group 8 then the process continues to step 214. In step 214, the storage manager 14 extends the existing data set or allocates a new data set in the common area 9c, 9d, . . . 9n. If however, there is insufficient space in the common area 9c, 9d, . . . 9n of storage group 8, then the process flows to step 216.

In step 216, the storage manager 14 determines from data set information 20 if the data set is a critical data set. If the storage manager 14 determines that the data set is not a critical data set then the process flows to step 218. In step 218, an error notification is provided to the user. In one embodiment, the error notification may be displayed to the user on display 21 of GUI 19. The notification may include information indicating that the common area 9c, 9d, . . . 9n of storage group 8 has insufficient storage space to extend the data set or allocate a new data set.

If however, it is determined in step 216 that the data set is a critical data set then the process flows to step 220. In step 220, the storage manager 14 determines if there is sufficient space in the critical reserve area 7c, 7d, . . . 7n of storage group 8 to entirely satisfy the storage space requirements of the extend or allocation request of step 210. If there is insufficient space in the critical reserve area 7c, 7d, . . . 7n of storage group 8, then the process flows to step 218. In step 218 an error notification is provided. As described above, the error notification may be displayed to the user on display 21 of GUI 19. The notification may include information indicating that the critical reserve area 7c, 7d, . . . 7n of storage group 8 has insufficient storage space to extend the existing data set or allocate a new data set.

If the storage manager 14 determines in step 220 that there is sufficient space in the critical reserve area 7c, 7d, . . . 7n of storage group 8, then the process flows to step 222. In step 222 the storage manager 14 extends the existing data set or allocates a new data set in the critical reserve area 7c, 7d, . . . 7n as requested in step 210. In step 224, the alert module 34 of storage manager 14 provides an alert. In one embodiment, the alert may be displayed to the user on display 21 of GUI 19. The alert may include information indicating that at least a portion of the critical reserve area 7c, 7d, . . . 7n was utilized. In one embodiment, the process then flows to step 226 in which the allocation module 24 of storage manager 14 allocates additional storage space to storage group 8.

Figure 3:
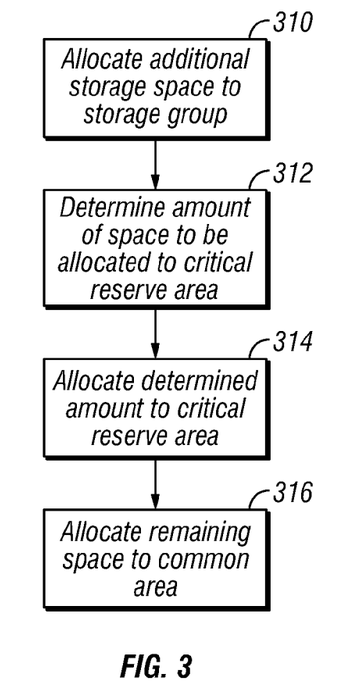
FIG. 3 is a flowchart of operations for allocating additional storage space to a storage group in accordance with an embodiment of the invention.

The process in which the allocation module 24 allocates the additional storage space to storage group 8 is illustrated in the flow chart of FIG. 3. In step 310, the allocation module 24 allocates additional storage space to storage group 8. In step 312, the storage manager 14 determines the amount of additional storage space to be allocated to the critical reserve area 7c, 7d, . . . 7n. As discussed above, the predefined percentage of available space is a set percentage of overall storage space of the storage group 8 which is reserved and maintained in the critical reserve area 7c, 7d, . . . 7n, and available for storing, extending, or allocating, critical data sets. Thus, the determination is made based on the predefined percentage stored in storage group information 18 (e.g. by a user) and by comparing the available storage space within the critical reserve area 7c, 7d, . . . 7n to the storage space in the storage group 8. In one embodiment, in the determination step of 312, the storage space in the storage group 8 includes the additional storage space allocated in step 310.

For example, a user may indicate that the predefined percentage of available storage space to be reserved for the critical reserve area 7c, 7d, . . . 7n is five percent of the total storage space of storage group 8. Accordingly, as more storage space is added to the storage group 8, the storage manager 14 determines the amount of the additional storage space to allocate to the critical reserve area 7c, 7d, . . . 7n such that the predefined percentage of available storage space (e.g. five percent) of the storage group 8 is maintained. As discussed above, the user may indicate the predefined percentage of available storage space to be reserved for the critical reserve area 7c, 7d, . . . 7n. In one embodiment, the predefined percentage of available storage space may be input by the user via GUI 19.

In step 314, the allocation module 24 allocates the determined amount of storage space to the critical reserve area 7c, 7d, . . . 7n. As discussed above, the allocation module 24 allocates the determined amount of additional storage space to the critical reserve area 7c, 7d, . . . 7n such that the predefined percentage of available storage space (e.g. five percent) of the storage group 8 is maintained in the critical reserve area 7c, 7d, . . . 7n.

The process then flows to step 316, in which the allocation module 14 allocates the remaining storage space of the additional storage space to the common area 9c, 9d, . . . 9n of storage group 8.

As discussed above, allocating additional storage space includes first allocating the determined amount of additional storage space to the critical reserve area 7c, 7d, . . . 7n such that the predefined percentage of available storage space is maintained, and subsequently, allocating the remaining amount of the additional storage space to the common area 9c, 9d, . . . 9n. Thus, when a user request exhausts the storage space within the common area 9c, 9d, . . . 9n of storage group 8, the critical reserve area 7c, 7d, . . . 7n has reserved storage space available to store critical data sets, preventing costly system down time.

For example, if a storage group 8 initially has two thousand (2000) GB of storage space allocated, and the user has indicated that five (5) percent of that space should be reserved for the critical reserve area 7c, 7d, . . . 7n, then the storage manager 14 reserves one hundred (100) GB of storage space for the critical reserve area 7c, 7d, . . . 7n. If in step 222 of FIG. 2, the storage manager 14 extends a data set or allocates a new data set in the critical reserve area 7c, 7d, . . . 7n, then alert module 34 will provide an alert. For example, the storage manager 14 may extend a data set in the critical reserve area 7c, 7d, . . . 7n, utilizing fifty (50) GB of storage space. Accordingly, the critical reserve area 7c, 7d, . . . 7n no longer has five percent of available storage space of storage group 8 allocated or reserved. In one embodiment, in response to the alert, the storage manager 14, in step 310, adds one thousand (1000) GB of additional storage space, for a total of three thousand (3000) GB of storage space in the storage group 8. In step 312, the storage manager 14 determines the amount of the additional storage space to be added to the critical reserve area 7c, 7d, . . . 7n such that the predefined five percent of available storage space is maintained. In this example, the storage manager 14 would determine that an additional one hundred (100) GB of storage space should be allocated to the critical reserve area 7c, 7d, . . . 7n, such that a total of one hundred and fifty (150) GB (the predefined five percent of available storage space of the three thousand (3000) GB of storage group's 8 total storage space) is reserved for the critical reserve area 7c, 7d, . . . 7n.

It should be appreciated that such operations can be embodied as a method implemented as an algorithm having software modules that are implemented by a computing system. Further, the method can be embodied as software on any computer readable media, as dedicated firmware, or as a combination of software and firmware, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The term logic may include, by way of example, software, hardware, firmware, and/or combinations of software and hardware.

Figure 4:
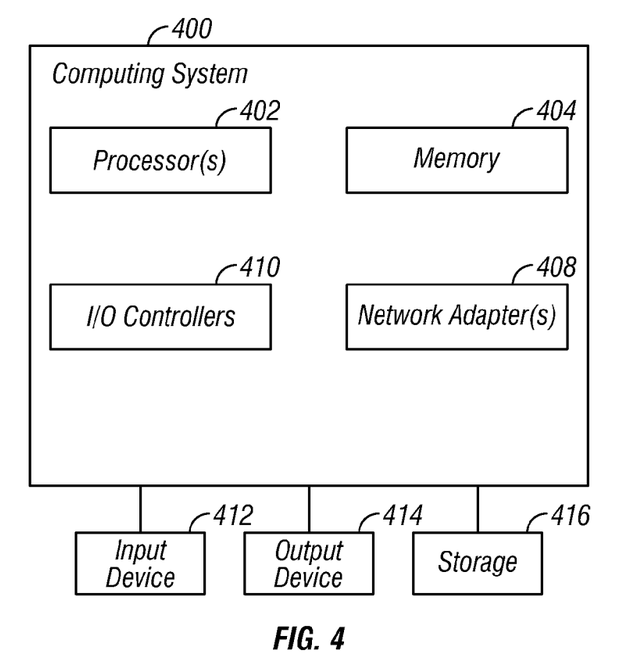
FIG. 4. is a illustrates a computing system that may be used in accordance with certain embodiments.

FIG. 4 illustrates a computing system 400 that may be used in accordance with certain embodiments. Client 3a, 3b, . . . 3n, and/or server 2 may implement computing system 400. The computing system 400 is suitable for storing and/or executing program code and includes at least one processor 402 coupled directly or indirectly to memory elements 404 through a system bus (not shown). The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system and one or more computer programs (not shown).

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The computing system 400 may be coupled to storage 416 (e.g., a non-volatile storage area, such as magnetic disk drives, optical disk drives, a tape drive, solid state storage devices, etc.). The storage 416 may comprise an internal storage device or an attached or network accessible storage. Computer programs in storage 416 may be loaded into the memory elements 404 and executed by a processor 402 in a manner known in the art.

The computing system 400 may include fewer components than illustrated, additional components not illustrated herein, or some combination of the components illustrated and additional components. The computing system 400 may comprise any computing device known in the art, such as a mainframe, server, personal computer, workstation, laptop, handheld computer, telephony device, network appliance, virtualization device, storage controller, mobile device, for example a personal digital assistant (PDA) or mobile phone, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer implemented method for allocating storage space in a storage group within a system managed storage environment, said storage group having a common area and a critical reserve area, said method comprising:
    reserving a predefined percentage of available storage space within said critical reserve area, wherein the critical reserve area stores critical data sets defined as critical in the storage group, wherein storage space in the critical reserve area storing critical data sets is not available storage space, and wherein the available storage space in the critical reserve area is available for storing, extending or allocating critical data sets;
    extending an existing data set or allocating a new data set in said critical reserve area;
    determining said storage group requires additional storage space in response to extending said existing data set or allocating said new data set in said critical reserve area; and
    allocating additional storage space to said storage group such that said predefined percentage of available storage space is maintained in said critical reserve area, wherein said predefined percentage of available space is determined by comparing available storage space within said critical reserve area to said storage space in said storage group.

2. The method of claim 1 wherein said common area is for storing non-critical data sets and critical data sets, and said critical reserve area is for storing critical data sets only when the common area has insufficient space.

3. The method of claim 1, wherein said extending an existing data set or allocating a new data set in said critical reserve area is in response to determining that there is insufficient storage space in said common area for said data set and when said data set is a critical data set.

4. The method of claim 1, further comprising providing an alert in response to extending said existing data set or allocating said new data set in said critical reserve area.

5. The method of claim 1, wherein said critical data sets are defined by assigning data sets to a data class with a critical attribute selected.

6. The method of claim 1, wherein said predefined percentage is defined by a user.

7. Computer-readable media having executable instructions stored thereon for causing components of a computing environment to perform a method, wherein said computing environment has at least one server coupled to a storage group, said storage group having a common area and a critical reserve area, said method comprising:
    reserving a predefined percentage of available storage within said critical reserve area, wherein the critical reserve area stores critical data sets defined as critical in the storage group, wherein storage space in the critical reserve area storing critical data sets is not available storage space, and wherein the available storage space in the critical reserve area is available for storing, extending or allocating critical data sets;
    extending an existing data set or allocating a new data set in said critical reserve area;
    determining said storage group requires additional storage space in response to extending said existing data set or allocating said new data set in said critical reserve area; and
    allocating additional storage space to said storage group such that said predefined percentage of available storage space is maintained in said critical reserve area, wherein said predefined percentage of available space is determined by comparing available storage space within said critical reserve area to said storage space in said storage group.

8. The computer-readable media of claim 7, wherein said common area is for storing non-critical data sets and critical data sets, and said critical reserve area is for storing critical data sets only when the common area has insufficient space.

9. The computer-readable media of claim 7, wherein said instructions for extending an existing data set or allocating a new data set in said critical reserve area is in response to determining that there is insufficient storage space in said common area for said data set and when said data set is a critical data set.

10. The computer-readable media of claim 7, further including instructions for providing an alert in response to extending said existing data set or allocating said new data set in said critical reserve area.

11. The computer-readable media of claim 7, wherein said critical data sets are defined by assigning data sets to a data class with a critical attribute selected.

12. The computer-readable media of claim 7, wherein said predefined percentage is defined by a user.

13. A computing environment comprising:
a server coupled to a storage group, said storage group having a common area and a critical reserve area;
said server including a processor coupled to memory;
said memory including computer-readable instructions implemented by said processor to:
reserve a predefined percentage of available storage space within said critical reserve area, wherein the critical reserve area stores critical data sets defined as critical in the storage group, wherein storage space in the critical reserve area storing critical data sets is not available storage space, and wherein the available storage space in the critical reserve area is available for storing, extending or allocating critical data sets;
extend an existing data set or allocate a new data set in said critical reserve area;
determine said storage group requires additional storage space in response to said extension of said existing data set or allocation of said new data in said critical reserve area; and
allocate additional storage space to said storage group such that said predefined percentage of available storage space is maintained in said critical reserve area, wherein said predefined percentage of available space is determined by comparing available storage space within said critical reserve area to said storage space in said storage group.

14. The computing environment of claim 13, wherein said common area is for storing non-critical data sets and critical data sets, and said critical reserve area is for storing critical data sets only when the common area has insufficient space.

15. The computing environment of claim 13, wherein said computer-readable instructions implemented by said processor to extend an existing data set or allocate a new data set in said critical reserve area is in response to a determined that there is insufficient storage space in said common area and when said data set is a critical data set.

16. The computing environment of claim 13, further comprising said computer-readable instructions implemented by said processor to provide an alert in response to extending said existing data set or allocating said new data set in said critical reserve area.

17. The computing environment of claim 13, said computer-readable instructions implemented by said processor wherein said critical data sets are defined by assigning data sets to a data class with a critical attribute selected.

18. The computing environment of claim 13, said computer-readable instructions implemented by said processor wherein said predefined percentage is defined by a user.

* * * * *